(12) United States Patent
Cheng et al.

(10) Patent No.: US 11,640,528 B2
(45) Date of Patent: May 2, 2023

(54) METHOD, ELECTRONIC DEVICE AND COMPUTER READABLE MEDIUM FOR INFORMATION PROCESSING FOR ACCELERATING NEURAL NETWORK TRAINING

(71) Applicant: Baidu USA LLC, Sunnyvale, CA (US)

(72) Inventors: Zhiyu Cheng, Sunnyvale, CA (US); Baopu Li, Santa Clara, CA (US); Yingze Bao, Mountain View, CA (US)

(73) Assignee: Baidu USA LLC, Sunnyvale, CA (US)

( * ) Notice: Subject to any disclaimer, the term of this patent is extended or adjusted under 35 U.S.C. 154(b) by 794 days.

(21) Appl. No.: 16/660,259

(22) Filed: Oct. 22, 2019

(65) Prior Publication Data

US 2021/0117776 A1    Apr. 22, 2021

(51) Int. Cl.
*G06N 3/08* (2023.01)
*G06N 20/00* (2019.01)
*G06N 3/048* (2023.01)

(52) U.S. Cl.
CPC ............... *G06N 3/08* (2013.01); *G06N 3/048* (2023.01); *G06N 20/00* (2019.01)

(58) Field of Classification Search
CPC ...... G06N 3/0481; G06N 20/00; G06N 3/088; G06N 3/0454; G06N 3/08
See application file for complete search history.

(56) References Cited

U.S. PATENT DOCUMENTS

2018/0046914 A1\* 2/2018 Li ........................... G06N 3/082
2019/0050723 A1\* 2/2019 Kong .................. G06K 9/6256

\* cited by examiner

*Primary Examiner* — Yosef K Laekemariam
(74) *Attorney, Agent, or Firm* — Nixon Peabody LLP

(57) ABSTRACT

A method for information processing for accelerating neural network training. The method includes: acquiring a neural network corresponding to a deep learning task; and performing iterations of iterative training on the neural network based on a training data set. The training data set includes task data corresponding to the deep learning task. The iterative training includes: processing the task data in the training data set using a current neural network, and determining, based on a processing result of the neural network on the task data in a current iterative training, prediction loss of the current iterative training; determining a learning rate and a momentum in the current iterative training; and updating weight parameters of the current neural network by gradient descent based on a preset weight decay, and the learning rate, the momentum, and the prediction loss in the current iterative training. This method achieves efficient and low-cost deep learning-based neural network training.

10 Claims, 5 Drawing Sheets

METHOD, ELECTRONIC DEVICE AND COMPUTER READABLE MEDIUM FOR INFORMATION PROCESSING FOR ACCELERATING NEURAL NETWORK TRAINING

TECHNICAL FIELD

Embodiments of the present disclosure relate to the field of computer technology, specifically to the field of computer data processing technology, and more specifically to a method, electronic device and computer readable medium for information processing for accelerating neural network training.

BACKGROUND

The deep convolutional neural network trained based on a data set has achieved good effects in the fields, such as image classification, object detection and segmentation, and language translation. However, due to huge training set, complex machine learning algorithm, and long training time, the computational cost for training the neural network are usually very large. Especially for small entities and individual deep learning researchers, it is considerably difficult to obtain breakthrough. Therefore, it is necessary to design an effective deep learning algorithm to obtain high-quality results with less resource usage to reducing training time and cost.

SUMMARY

Embodiments of the present disclosure present a method, apparatus, electronic device, and computer readable medium for information processing for accelerating neural network training.

In a first aspect, an embodiment of the present disclosure provides a method for information processing for accelerating neural network training, comprising: acquiring a neural network corresponding to a deep learning task; and performing a plurality of iterations of iterative training on the neural network based on a training data set, wherein the training data set comprises task data corresponding to the deep learning task, and the iterative training comprises: processing the task data in the training data set using a current neural network, and determining, based on a processing result of the neural network on the task data in a current iterative training, prediction loss of the current iterative training; determining, based on a preset learning rate function, a preset momentum function, and a current number of iterations, a learning rate and a momentum in the current iterative training; and updating weight parameters of the current neural network by gradient descent based on a preset weight decay, and the learning rate, the momentum, and the prediction loss in the current iterative training.

In some embodiments, the neural network comprises: at least one combination layer, at least one residual module, at least one pooling layer, and at least one fully connected layer, wherein the combination layer is formed by connecting at least one convolutional layer, at least one batch normalization layer, and at least one activation function layer, and the residual module comprises at least two successively connected combination layers.

In some embodiments, the preset learning rate function comprises: a nonlinear function with a function value varying with a number of iterations.

In some embodiments, the preset learning rate function is:

$$\text{lr}\_t = \text{lr}\_\min + \frac{1}{2}(\text{lr}\_\max - \text{lr}\_\min)\left(1 - \cos\left(2\pi \times \frac{\text{T}\_\text{cur}}{\text{T}\_\text{tot}}\right)\right),$$

wherein lr_t represents a value of the learning rate in a t-th iterative training, lr_min represents a minimum value of the learning rate, lr_max represents a maximum value of the learning rate, T_cur represents a cumulative number of iterations prior to the t-th iterative training, and T_tot represents a preset total number of iterations.

In some embodiments, the preset momentum function comprises: a nonlinear function with a function value varying with a number of iterations.

In some embodiments, the method further comprises: acquiring the training data set corresponding to the deep learning task, and performing data augmentation processing on the training data set.

In some embodiments, the performing data augmentation processing on the training data set comprises: performing data cutout and/or data mixup on the task data in the training data set to generate new task data, and adding the new task data to the training data set.

In some embodiments, the method further comprises: processing to-be-processed data of the deep learning task using the neural network obtained by a plurality of iterations of iterative training, and outputting a processing result of the to-be-processed data.

In a second aspect, an embodiment of the present disclosure provides an electronic device, comprising: one or more processors; and a storage unit configured to store one or more programs, the one or more programs, when executed by the one or more processors, causing the one or more processors to: acquire a neural network corresponding to a deep learning task; and perform a plurality of iterations of iterative training on the neural network based on a training data set, wherein the training data set comprises task data corresponding to the deep learning task, and the iterative training comprises: processing the task data in the training data set using a current neural network, and determining, based on a processing result of the neural network on the task data in a current iterative training, prediction loss of the current iterative training; determining, based on a preset learning rate function, a preset momentum function, and a current number of iterations, a learning rate and a momentum in the current iterative training; and updating weight parameters of the current neural network by gradient descent based on a preset weight decay, and the learning rate, the momentum, and the prediction loss in the current iterative training.

In a third aspect, an embodiment of the present disclosure provides a computer readable medium, storing a computer program thereon, wherein the computer program, when executed by one or more processors, causes the one or more processors to: acquire a neural network corresponding to a deep learning task; and perform a plurality of iterations of iterative training on the neural network based on a training data set, wherein the training data set comprises task data corresponding to the deep learning task, and the iterative training comprises: processing the task data in the training data set using a current neural network, and determining, based on a processing result of the neural network on the task data in a current iterative training, prediction loss of the current iterative training; determining, based on a preset learning rate function, a preset momentum function, and a current number of iterations, a learning rate and a momentum in the current iterative training; and updating weight parameters of the current neural network by gradient descent based on a preset weight decay, and the learning rate, the momentum, and the prediction loss in the current iterative training.

The method, apparatus, electronic device, and computer readable medium for information processing for accelerating neural network training according to the above embodiments of the present disclosure acquire a neural network corresponding to a deep learning task, and perform a plurality of iterations of iterative training on the neural network based on a training data set, wherein the training data set comprises task data corresponding to the deep learning task, and the iterative training comprises: processing the task data in the training data set using a current neural network, and determining, based on a processing result of the neural network on the task data in a current iterative training, prediction loss of the current iterative training; determining, based on a preset learning rate function, a preset momentum function, and a current number of iterations, a learning rate and a momentum in the current iterative training; and updating weight parameters of the current neural network by gradient descent based on a preset weight decay, and the learning rate, the momentum, and the prediction loss in the current iterative training, thereby achieving fast, efficient, and relatively low-cost deep learning-based neural network training.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described in detail below in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described in detail below with reference to the accompanying drawings and in combination with the embodiments.

Figure 1:
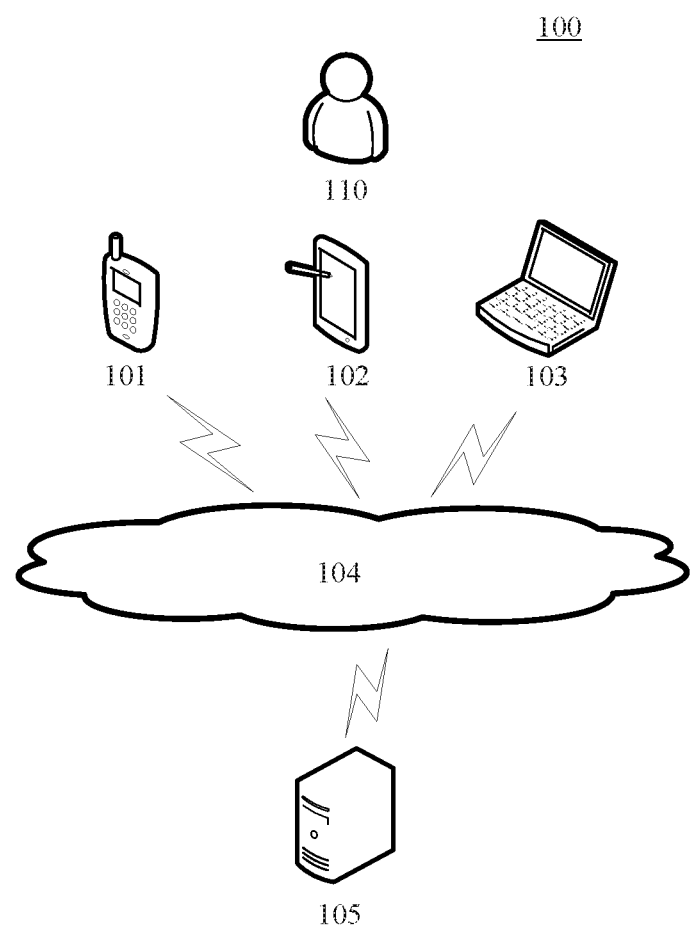
FIG. 1 is a diagram of an example system architecture in which embodiments of the present disclosure may be implemented.

FIG. 1 shows an example system architecture 100 in which a method or apparatus for information processing for accelerating neural network training of embodiments of present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

The terminal devices 101, 102, and 103 interact with the server 105 via the network 104, for example, to receive or send a message. The terminal devices 101, 102, and 103 may be provided with various client applications, e.g., image processing applications, information analysis applications, voice assistant applications, shopping applications, and financial applications.

The terminal devices 101, 102, and 103 may be hardware or software. When the terminal devices 101, 102, and 103 are hardware, the terminal devices may be various electronic devices, including but not limited to a smart phone, a tablet computer, an e-book reader, a laptop portable computer, a desktop computer, and the like. When the terminal devices 101, 102, and 103 are software, the terminal devices may be installed in the above-listed electronic devices. The terminal devices 101, 102, and 103 may be implemented as a plurality of software programs or software modules (e.g., software programs or software modules configured to provide distributed services), or may be implemented as a single software program or software module. This is not specifically limited here.

The server 105 may be a server running various tasks, e.g., a server running a task of deep neural network training. The server 105 may acquire a training data set from the terminal devices 101, 102, and 103 or an existing database, and train a corresponding neural network model based on the training data set, self-adaptively depending on different deep learning tasks, such as image classification, object identification, speech synthesis, and natural language understanding.

The server 105 may further be, e.g., a back-end server providing back-end support for applications installed on the terminal devices 101, 102, and 103. For example, the server 105 may receive to-be-processed task data sent by the terminal devices 101, 102, and 103, execute task processing using the method for information processing for accelerating neural network training, and return a processing result to the terminal devices 101, 102, and 103.

In some specific examples, the terminal devices 101, 102, and 103 may send a task-related data processing request, such as speech synthesis, text classification, natural language understanding, and image identification, to the server 105. The server 105 may run a neural network model obtained by training for a corresponding task, and process data using the neural network model.

It should be noted that the method for information processing for accelerating neural network training provided by the embodiments of the present disclosure is generally executed by the server 105. Accordingly, the apparatus for information processing for accelerating neural network training is generally provided in the server 105.

It should be further noted that, in some scenarios, the server 105 may acquire the training data set and to-be-processed data from a database, a memory, or other devices. Then, the example system architecture 100 may not have the terminal devices 101, 102, and 103, or the network 104.

It should be noted that the server 105 may be hardware or software. When the server 105 is hardware, the server may be implemented as a distributed server cluster composed of a plurality of servers, or be implemented as a single server. When the server 105 is software, the server may be implemented as a plurality of software programs or software modules (e.g., a plurality of software programs or software modules for providing distributed services), or be implemented as a single software program or software module. This is not specifically limited here.

It should be understood that the numbers of terminal devices, networks, and servers in FIG. 1 are merely illustrative. Any number of terminal devices, networks, and servers may be provided based on actual requirements.

Figure 2:
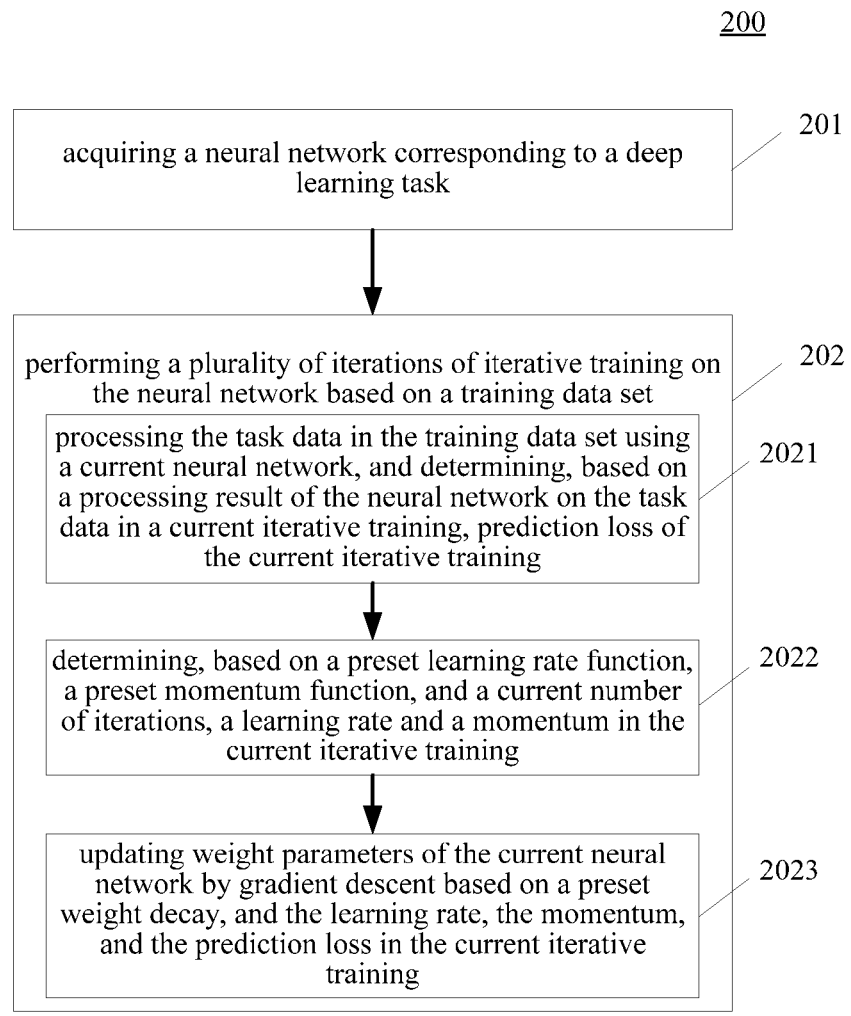
FIG. 2 is a flowchart of a method for information processing for accelerating neural network training according to an embodiment of the present disclosure.

Further referring to FIG. 2, a process 200 of a method for information processing for accelerating neural network training according to an embodiment of the present disclosure is shown. The method for information processing for accelerating neural network training includes the following steps:

Step 201: acquiring a neural network corresponding to a deep learning task.

In the present embodiment, an executing body of the method for information processing for accelerating neural network training may acquire a corresponding neural network based on the deep learning task. The acquired neural network may be a neural network having a specific network structure and an initial parameter. The neural network may be trained in subsequent steps to obtain an ability to execute the corresponding deep learning task. Here, the deep learning task may be a task of processing data or information using a neural network, and extracting potential features to discover intrinsic attributes of the data or information. For example, the deep learning task may include speech identification, image classification, object detection and tracking, natural language understanding, machine translation, trend forecasting, intelligent recommendation, medical diagnosis, and so on.

For different deep learning tasks, different neural network structures may be pre-designed correspondingly. The neural network may be a convolution neural network, a recurrent neural network, and so on. The neural network structures may be designed by combining conventional neural network layers. Alternatively, NAS (neural architecture search) may be used to establish a network architecture search space and search network structures for the deep learning tasks.

In the present embodiment, a neural network corresponding to a specified deep learning task may be acquired from a pre-designed neural network corresponding to each type of deep learning task, for use as a to-be-trained neural network.

In some alternative implementations of the present embodiment, the above neural network corresponding to the deep learning task may include at least one combination layer, at least one residual module, at least one pooling layer, and at least one fully connected layer. The combination layer may be formed by connecting at least one convolutional layer, at least one batch normalization layer, and at least one activation function layers, and the residual module includes at least two successively connected combination layers. In practice, the residual module may be, for example, formed by successively connecting three of the combination layers.

The combination layer first extracts features of the input data by the convolutional layer, and then performs batch normalization processing and activation function computing on the extracted features. After the batch normalization processing, distribution of the features extracted by the convolutional layer is smoothed, such that when updating weight parameters of the neural network by gradient descent after the activation function computing, the gradient diffusion rate is decreased, thus contributing to improving the training speed. It should be noted that the number of convolutional layers of the combination layer is not particularly limited in the present embodiment.

Figure 3:
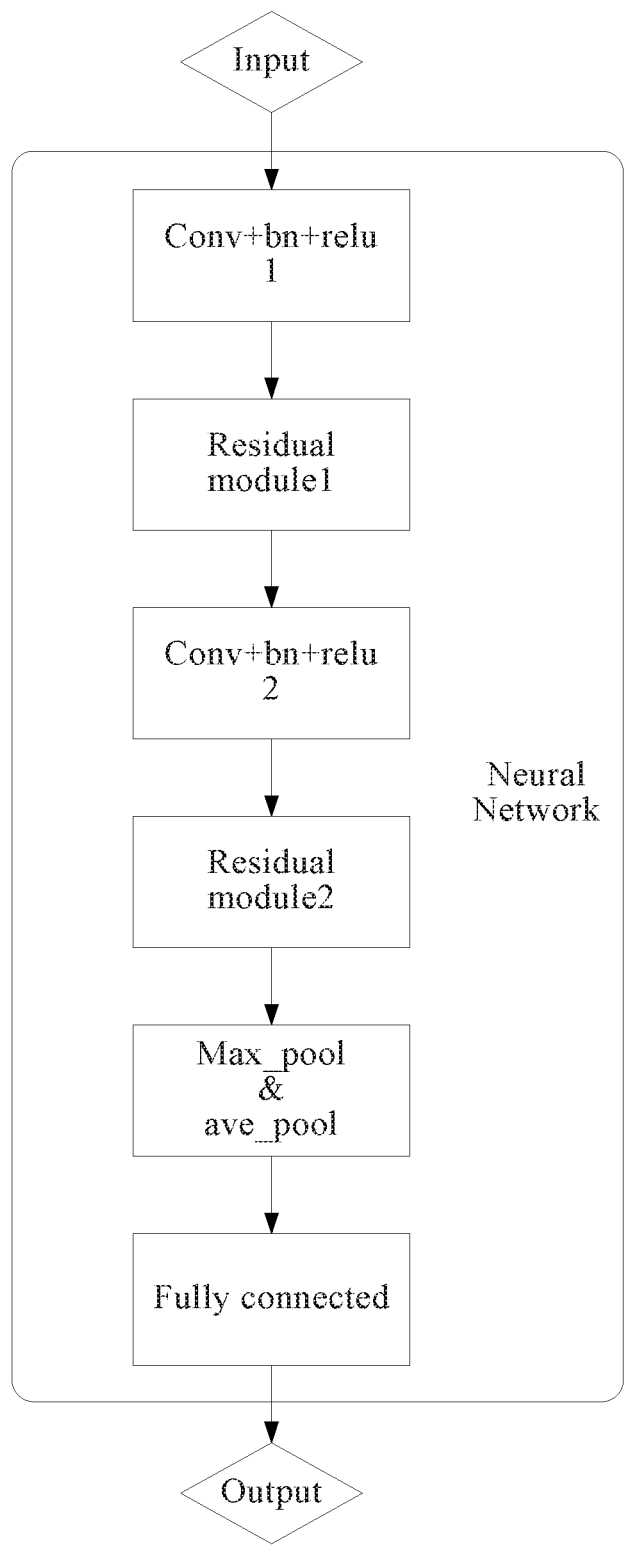
FIG. 3 is an exemplary schematic structural diagram of a neural network in the method for information processing for accelerating neural network training according to an embodiment of the present disclosure.

FIG. 3 shows a schematic structural diagram of a neural network in the method for information processing for accelerating neural network training according to an embodiment of the present disclosure. As show in FIG. 3, the neural network includes successively connected combination layer 1 (Conv+bn+relu 1), residual module 1, combination layer 2 (Conv+bn+relu 2), residual module 2, pooling layer (including a maximum pooling layer Max_pool and an average pooling layer avg_pool), and fully connected layer. Input data "Input" are processed successively through the combination layer 1, the residual module 1, the combination layer 2, the residual module 2, the pooling layer, and the fully connected layer, to generate corresponding output data "Output."

The above neural network including at least one combination layer, at least one residual module, at least one pooling layer, and at least one fully connected layer uses a simple structure, thus contributing to reducing resource consumption in the training process. During design, the number of different layers and a connection relationship of neurons between the layers are designed targetedly based on different deep learning tasks. The neural network may fast and efficiently complete the deep learning task via a simple network structure.

Step 202: performing a plurality of iterations of iterative training on the neural network based on a training data set.

The executing body (e.g., the server shown in FIG. 1) may acquire the training data set of the deep learning task. The training data set may include task data corresponding to the deep learning task. The task data are data to be processed using the neural network, and are a task object of the neural network. Alternatively, in supervised learning, the training data set may further include annotation data corresponding to the task data. The annotation data are a desired processing result of the task data. The desired processing result may be used as a basis for training the neural network, and guides the neural network to learn a method of converting the task data into the corresponding desired process result.

Alternatively, the annotation data may be expressed in the form of a tag.

As an example, in a speech identification task, the training data set may include a large number of speech signals. The speech signals are task data of the speech identification task. The neural network uses a speech signal as a task object, and recognizes text or semantics corresponding to the speech signal. Alternatively, the training data set may include text annotation information or semantic annotation information for each speech signal.

Further, the task data in the training data set may include positive sample data and negative sample data. Processing result annotation data corresponding to the positive sample data are consistent with the corresponding desired processing result, and processing result annotation data corresponding to the negative sample data are inconsistent with the corresponding desired processing result.

The plurality of iterations of iterative training on the neural network may be performed using the training data set. The neural network is updated in accordance with a certain strategy in each iterative training. A last iterative training continues iterative update on the basis of the neural network updated in a prior iterative training. Thus, the neural network is iteratively updated through the plurality of iterations of iterative training, until reaching a preset number of iterations, or when the neural network reaches a certain accuracy, the updating the neural network may be stopped. Thus, a completely trained neural network is obtained.

In the present embodiment, the neural network updating includes updating weight parameters of the neural network. The weight parameters may be updated by gradient descent. At the beginning of each iterative training, the weight parameters of the neural network is the weight parameters obtained by updating in the last iterative training.

Specifically, the iterative training may include step 2021, step 2022, and step 2023.

First, step 2021 includes processing task data in the training data set using a current neural network, and determining, based on a processing result of the neural network on the task data in a current iterative training, prediction loss of the current iterative training.

If the current iterative training is not the first iterative training in the training process, then the current neural network is a neural network obtained by updating the weight parameters in the last iterative training. It should be noted that, if the current iterative training is the first iterative training in the training process, then the current neural network may be an initial neural network acquired in step 201.

Here, various deep learning tasks may be abstracted as prediction tasks. A portion of data may be selected from the training data set for use as the task data, and inputted into the current neural network, to obtain a processing result of the current neural network on the inputted task data. Then, the prediction loss of the current neural network may be computed using a preset loss function, i.e., determining the prediction loss of the current iterative training. The loss function may be used for characterizing a difference between the processing result of the current neural network on the inputted task data and the desired processing result of the inputted task data, and the value of the loss function is the prediction loss of the current neural network.

Then, step 2022 includes determining, based on a preset learning rate function, a preset momentum function, and a current number of iterations, a learning rate and a momentum in the current iterative training.

The learning rate function may be a function characterizing a learning rate of the neural network varying with the number of iterations or training time. The learning rate is a parameter controlling a step size of gradient descent when adjusting the weight parameters by gradient descent. In the present embodiment, the learning rate function may be preset to determine a relationship of the learning rate varying with the number of iterations or training time. And statistics of the number of iterations or training time in real time may be obtained in the training process. The learning rate function may be, e.g., a linear function decreasing with the number of iterations. The larger is the number of iterations, the lower is the learning rate.

In each iterative training, the learning rate in the current iterative training may be computed based on the current number of iterations and the preset learning rate function.

In some alternative implementations of the present embodiment, the preset learning rate function includes: a nonlinear function with a function value varying with the number of iterations. In order to accelerate a convergence speed of the prediction loss, whilst ensuring the accuracy of the neural network, the learning rate function may be set in accordance with the following strategy: in early iterative training, the neural network accuracy is poor, such that the learning rate may be gradually increased with the increase of the number of iterations to enhance the training speed; while after the prediction loss (i.e., prediction error) of the neural network converges to a certain range, the learning rate is gradually decreased with the increase of the number of iterations of iterative training to ensure the accuracy. A nonlinear function satisfying the above strategy may be set by mathematical fitting methods or based on practical experience, for use as the learning rate function.

Figure 4:
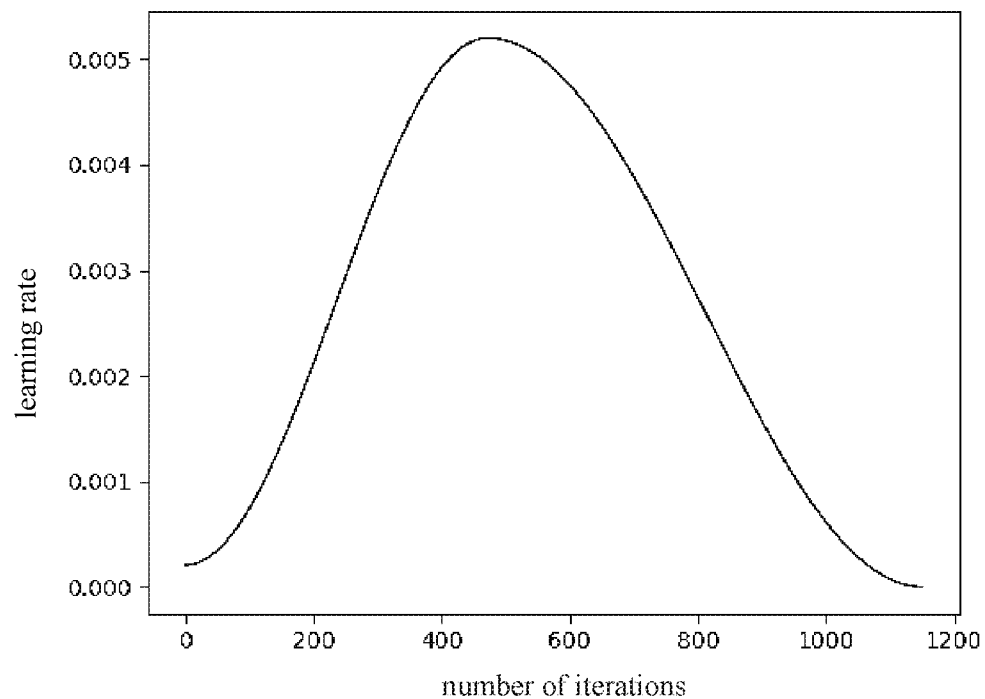
FIG. 4 is an exemplary function graph of a learning rate function in the method for information processing for accelerating neural network training according to an embodiment of the present disclosure.

Referring to FIG. 4, an exemplary function graph of a learning rate function in the method for information processing for accelerating neural network training according to an embodiment of the present disclosure is shown. As shown in FIG. 4, with the increase of the number of iterations, the value of the learning rate function (i.e., the learning rate) is nonlinearly increased, and after reaching the maximum value, the value of the learning rate function is nonlinearly decreased with the number of iterations.

Further alternatively, the above preset learning rate function may be established based on a cosine function, specifically:

$$\text{lr}\_t = \text{lr}\_\min + \frac{1}{2}(\text{lr}\_\max - \text{lr}\_\min)\left(1 - \cos\left(2\pi \times \frac{\text{T}\_\text{cur}}{\text{T}\_\text{tot}}\right)\right), \quad (1)$$

lr_t represents a value of the learning rate in a t-th iterative training, lr_min represents a minimum value of the learning rate, lr_max represents a maximum value of the learning rate, lr_min and lr_max may be preset values, T_cur represents a cumulative number of iterations prior to the t-th iterative training, and T_tot represents a preset total number of iterations.

The momentum function may be a function characterizing a momentum of the training process of the neural network varying with the number of iterations or training time. The momentum is a parameter controlling weight update direction and speed when updating the weight parameters of the neural network by gradient descent. When updating the weight parameters of the neural network, the momentum may augment parameters with current gradient directions identical to a gradient direction of last iterative training, such that iterations in these directions are accelerated; and reduce parameters with current gradient directions different from the gradient direction of the last iterative training, such that iterations in these directions are slowed down, thus accelerating the convergence speed.

In the present embodiment, a relationship of the momentum varying with the number of iterations or training time may be preset, and the number of iterations or training time is statistically obtained in real time in the training process. In each iterative training, the momentum corresponding to the current iterative training is determined based on the preset momentum function.

Alternatively, the preset momentum function includes a nonlinear function with a function value varying with the number of iterations. As an example, the momentum function may meet the following variation trend: with the increase of the number of iterations, the value of the momentum function is nonlinearly decreased from the maximum value to the minimum value, and then nonlinearly increased. Alternatively, the momentum function may be further established using the cosine function based on a ratio of the current accumulated number of iterations to the total number of iterations.

Step 2023: updating weight parameters of the current neural network by gradient descent based on a preset weight decay, and the learning rate, the momentum, and the prediction loss in the current iterative training.

The weight decay is a parameter for preventing the neural network from "overfitting" in training, and is generally in an interval [0, 1]. The weight decay acts on a regularization term of the loss function. The regularization term may be used for characterizing the complexity of the neural network. After the weight decay acts on the regularization term of the loss function, the complexity of the neural network may be reduced, to prevent the neural network from becoming excessively complex with the increase of the number of iterations, thus avoiding overfitting of the neural network on the training data set.

In practice, the weight decay may be preset based on different deep learning tasks and different training data sets. The weight decay value may also be related to the neural network structure. In practice, for each neural network structure, the weight decay value may be validated based on a plurality of experiments, and the weight decay corresponding to different neural network structures may be set based on the validation results. For example, for CIFAR10 data set, the neural network structure shown in FIG. 3 is employed, and the weight decay may be set as 0.42.

In each iterative training, the prediction loss of the current iterative training may be computed based on the loss function, and then a weight gradient of the prediction loss of the current iterative training on the neural network is computed. The executing body may acquire the preset weight decay, and the learning rate and the momentum determined based on the current accumulated number of iterations, and update weight parameters of the neural network using the weight decay, the learning rate, the momentum, and the weight gradient, to achieve updation of the neural network. In the next iterative training, the weight parameters of the neural network is further updated based on gradient descent on the basis of the neural network updated in the current iterative training. Thus, the neural network parameters are gradually updated through a plurality of iterations of iterative training.

At present, most of the neural network stores the parameters and related data in the iterative training using 32-bit single precision floating point numbers (FP32). In some alternative implementations of the present embodiment, mixed precision training may be employed in the above iterative training, and specifically, the weight, gradient, inputted data, and the like of the neural network may be stored as 16-bit floating point numbers (FP16). Alternatively, operations executed in the training may be automatically checked based on an open-source tool library released by NVIDIA, and FP16 or FP32 is determined to be used for storing data, thus achieving automated mixed precision training, further enhancing the computing speed and reducing the storage resource consumption.

Alternatively, distributed training may also be employed, and specifically, the neural network is trained using GPU (Graphics Processing Unit) in combination with a multi-threaded approach. For example, each GPU independently runs one thread, multiple threads complete training the neural network by collaborative computing based on a collective communication strategy, thus further enhancing the computing speed, and shortening the training time. The batch size in the training process may be further set, and each thread is responsible for training a batch, thus further enhancing the training speed by multi-GPU and multi-thread in combination with a corresponding batch size.

As an example, in practice, a batch size of 1024 may be selected, and neural network training based on the CIFAR10 data set in an image classification task is completed using 8 NVIDIA Tesla V100 GPU servers.

In the method for information processing for accelerating neural network training in the present embodiment, when number of iterations reaches the preset total number of iterations, the iterative training may be stopped, and a completely trained neural network is obtained.

The method for information processing for accelerating neural network training according to the above embodiments of the present disclosure acquires a neural network corresponding to a deep learning task, and performs a plurality of iterations of iterative training on the neural network based on a training data set, wherein the training data set comprises task data corresponding to the deep learning task, and the iterative training comprises: processing the task data in the training data set using a current neural network, and determining, based on a processing result of the neural network on the task data in a current iterative training, prediction loss of the current iterative training; determining, based on a preset learning rate function, a preset momentum function, and a current number of iterations, a learning rate and a momentum in the current iterative training; and updating weight parameters of the current neural network by gradient descent based on a preset weight decay, and the learning rate, the momentum, and the prediction loss in the current iterative training, thereby achieving fast neural network training. The learning rate and the momentum dynamically change with the number of iterations, thus effectively accelerating the convergence speed of the error of neural network, and enhancing the accuracy of the neural network, such that the model accuracy can reach a high level in a short time, thereby reducing the resources occupied by the neural network training.

In some alternative implementations of the above embodiments, the method for information processing for accelerating neural network training may further include: acquiring the training data set corresponding to the deep learning task, and performing data augmentation processing on the training data set.

Before training the neural network, the training data set for training the neural network may be obtained. The training data set may be an existing data set corresponding to the deep learning task, such as the conventional CIFAR data set in the image classification task. The training data set may also be a data set established by collecting the corresponding task data for the deep learning task, e.g., for the speech identification task. The training data set is established by extracting voice data from audio and video data, and a text corresponding to the voice data may be annotated to generate the text annotation information of various voice data in the training data set.

In the present embodiment, the training data set may be pre-collected and stored in a database. After acquiring the training data set, the training data set may be expanded by data augmentation, such that data distribution in the training data set is smoother, thus reducing the probability of neural network overfitting. For example, new task data may be generated by, e.g., scale change, rotation, noise addition, or filtering of the task data in the training data set, and the new task data are added to the training data set.

Further, data augmentation processing on the training data set may be performed as follows: performing data cutout and/or data mixup on the task data in the training data set, generating the new task data, and adding the new task data to the training data set. Cutout means to cut out or trim data, for example, removing a random portion of data. Mixup means to linearly or nonlinearly superimpose any two or more pieces of data. For example, for the image classification task, new image data New_image=r×image 1+(1−r)× image 2, where image 1 and image 2 are any two images in the training data set, and r is a number between 0 and 1.

In some embodiments, the method for information processing for accelerating neural network training may further include: processing to-be-processed data of the deep learning task using the neural network obtained by a plurality of iterations of iterative training, and outputting a processing result of the to-be-processed data.

The to-be-processed data of the deep learning task may be processed using the completely trained neural network. Here, the to-be-processed data may be data of a type identical to the type of the task data in the above training data set. For example, in the image classification task, the task data in the training data set are image data, the task data tag is an image category tag, the corresponding to-be-processed data may be a to-be-classified image, and the processing result of the to-be-processed data is the category of the to-be-classified image; and in the speech synthesis task, the task data in the training data set are text data, annotation information of the task data is corresponding synthetic speech, the corresponding to-be-processed data may be text to be synthesized into speech, and the processing result of the to-be-processed data is synthetic speech.

After an effective and reliable neural network is obtained by the method for information processing for accelerating neural network training, the method for information processing for accelerating neural network training processes the to-be-processed data using the neural network, thus obtaining more accurate data processing result, and efficiently and reliably completing data processing based on the deep learning method.

Figure 5:
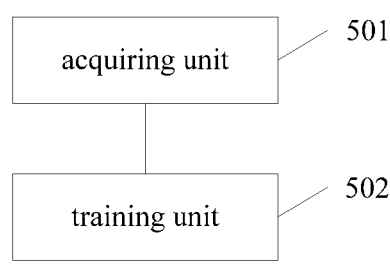
FIG. 5 is a schematic structural diagram of an apparatus for information processing for accelerating neural network training according to an embodiment of the present disclosure.

Further referring to FIG. 5, as an implementation of the method for information processing for accelerating neural network training, an embodiment of the present disclosure provides an apparatus for information processing for accelerating neural network training. The embodiment of the apparatus corresponds to the embodiment of the method shown in FIG. 2. The apparatus may be specifically applied to various electronic devices.

As shown in FIG. 5, the apparatus for information processing for accelerating neural network training of the present embodiment includes: an acquiring unit 501, and a training unit 502. The acquiring unit 501 is configured to acquire a neural network corresponding to a deep learning task; and the training unit 502 is configured to perform a plurality of iterations of iterative training on the neural network based on a training data set, wherein the training data set comprises task data corresponding to the deep learning task, and the iterative training comprises: processing the task data in the training data set using a current neural network, and determining, based on a processing result of the neural network on the task data in a current iterative training, prediction loss of the current iterative training; determining, based on a preset learning rate function, a preset momentum function, and a current number of iterations, a learning rate and a momentum in the current iterative training; and updating weight parameters of the current neural network by gradient descent based on a preset weight decay, and the learning rate, the momentum, and the prediction loss in the current iterative training.

In some embodiments, the neural network includes at least one combination layer, at least one residual module, at least one pooling layer, and at least one fully connected layer, wherein the combination layer is formed by connecting at least one convolutional layer, at least one batch normalization layer, and at least one activation function layer, and the residual module includes at least two successively connected combination layers.

In some embodiments, the preset learning rate function includes: a nonlinear function with a function value varying with the number of iterations.

In some embodiments, the preset learning rate function is:

$$\text{lr\_t} = \text{lr\_min} + \frac{1}{2}(\text{lr\_max} - \text{lr\_min})\left(1 - \cos\left(2\pi \times \frac{\text{T\_cur}}{\text{T\_tot}}\right)\right),$$

lr_t represents a value of the learning rate in a t-th iterative training, lr_min represents a minimum value of the learning rate, lr_max represents a maximum value of the learning rate, T_cur represents a cumulative number of iterations prior to the t-th iterative training, and T_tot represents a preset total number of iterations.

In some embodiments, the preset momentum function includes: a nonlinear function with a function value varying with the number of iterations.

In some embodiments, the apparatus further includes: an augmenting unit configured to acquire the training data set corresponding to the deep learning task, and perform data augmentation processing on the training data set.

In some embodiments, the data augmenting unit is further configured to perform data augmentation processing on the training data set as follows: performing data cutout and/or data mix upon the task data in the training data set to generate new task data, and adding the new task data to the training data set.

In some embodiments, the apparatus further includes: a processing unit configure to process to-be-processed data of the deep learning task using the neural network obtained by a plurality of iterations of iterative training, and output a processing result of the to-be-processed data.

It should be understood that the units disclosed in the apparatus 500 correspond to the steps in the method described in FIG. 2. Therefore, the operations and features described above for the method also apply to the apparatus 500 and the units included therein. The description will not be repeated here.

Figure 6:
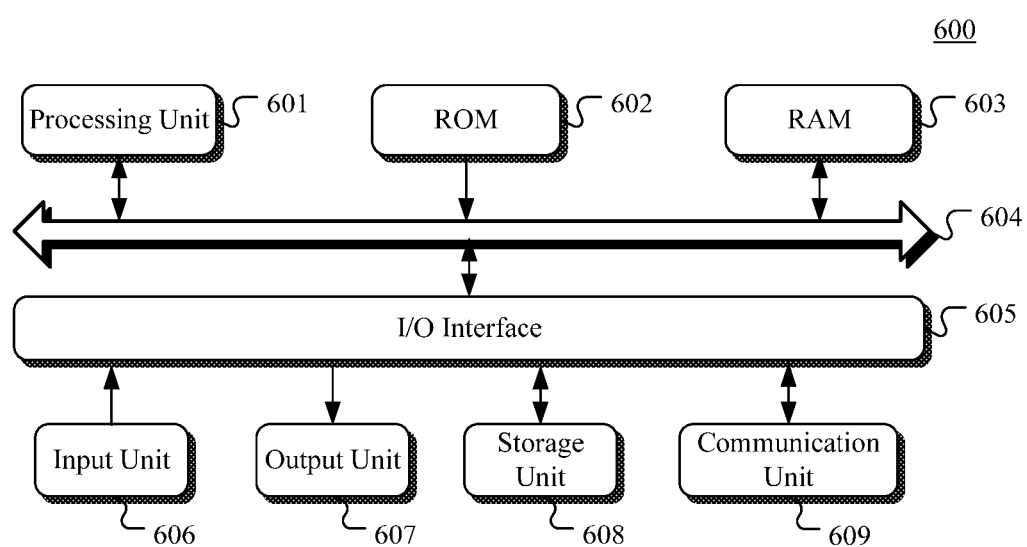
FIG. 6 is a schematic structural diagram of a computer system adapted to implement an electronic device of some embodiments of the present disclosure.

Referring to FIG. 6 below, a schematic structural diagram adapted to implement an electronic device (e.g., the server shown in FIG. 1) 600 of some embodiments of the present disclosure is shown. The electronic device shown in FIG. 6 is merely an example, and should not limit the functions and scope of use of some embodiments of the present disclosure.

As shown in FIG. 6, the electronic device 600 may include a processing unit (e.g., a central processing unit, or a graphics processor) 601, which may execute various appropriate actions and processes in accordance with a program stored in a read only memory (ROM) 602 or a program loaded into a random access memory (RAM) 603 from a storage unit 608. The RAM 603 further stores various programs and data required by operations of the electronic device 600. The processing unit 601, the ROM 602, and the RAM 603 are connected to each other through a bus 604. An input/output (I/O) interface 605 is also connected to the bus 604.

Generally, the following units may be connected to the I/O interface 605: an input unit 606 including a touch screen, a touch pad, a keyboard, a mouse, a camera, a microphone, an accelerometer, a gyroscope, or the like; an output unit 607 including a liquid crystal displayer (LCD), a speaker, a vibrator, or the like; a storage unit 608 including a hard disk, or the like; and a communication unit 609. The communication unit 609 may allow the electronic device 600 to exchange data with other devices through wireless or wired communication.

While FIG. 6 shows the electronic device 600 having various units, it should be understood that it is not necessary to implement or provide all of the units shown in the figure. More or fewer units may be alternatively implemented or provided. Each block shown in FIG. 6 may represent a unit, or represent a plurality of units as required.

In particular, according to some embodiments of the present disclosure, the process described above with reference to the flow chart may be implemented in a computer software program. For example, some embodiments of the present disclosure include a computer program product, which includes a computer program that is tangibly embedded in a computer readable medium. The computer program includes program codes for executing the method illustrated in the flow chart. In such an embodiment, the computer program may be downloaded and installed from a network via the communication unit 609, or be installed from the storage unit 608, or be installed from the ROM 602. The computer program, when executed by the processing unit 601, implements the above functions as defined by the method of some embodiments of the present disclosure. It should be noted that the computer readable medium according to some embodiments of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable storage medium may be any tangible medium containing or storing programs which may be used by, or used in combination with, a command execution system, apparatus or element. In some embodiments of the present disclosure, the computer readable signal medium may include a data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may further be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wire, an optical cable, a RF (radio frequency) medium etc., or any suitable combination of the above.

The computer readable medium may be included in the above electronic device; or a stand-alone computer readable medium without being assembled into the electronic device. The computer readable medium carries one or more programs. The one or more programs, when executed by the electronic device, cause the electronic device to: acquire a neural network corresponding to a deep learning task, and perform a plurality of iterations of iterative training on the neural network based on a training data set, wherein the training data set comprises task data corresponding to the deep learning task, and the iterative training comprises: processing the task data in the training data set using a current neural network, and determining, based on a processing result of the neural network on the task data in a current iterative training, prediction loss of the current iterative training; determining, based on a preset learning rate function, a preset momentum function, and a current number of iterations, a learning rate and a momentum in the current iterative training; and updating weight parameters of the current neural network by gradient descent based on a preset weight decay, and the learning rate, the momentum, and the prediction loss in the current iterative training.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language, or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer via any network, including local area network (LAN) or wide area network (WAN), or may be connected to an external computer (for example, connected via the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including an acquiring unit and a training unit. The names of the units do not constitute a limitation to such units themselves in some cases. For example, the acquiring unit may be further described as "a unit configured to acquire a neural network corresponding to a deep learning task."

The above description only provides an explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure, for example, technical solutions formed by interchanging the above-described features with, but not limited to, technical features with similar functions disclosed in the present disclosure.

What is claimed is:

1. A method for information processing for accelerating neural network training, comprising:
   acquiring a neural network corresponding to a deep learning task; and
   performing a plurality of iterations of iterative training on the neural network based on a training data set, wherein the training data set comprises task data corresponding to the deep learning task, and
   the iterative training comprises:
   processing the task data in the training data set using a current neural network, and determining, based on a processing result of the neural network on the task data in a current iterative training, prediction loss of the current iterative training;
   determining, based on a preset learning rate function, a preset momentum function, and a current number of iterations, a learning rate and a momentum in the current iterative training; and
   updating weight parameters of the current neural network by gradient descent based on a preset weight decay, and the learning rate, the momentum, and the prediction loss in the current iterative training.

2. The method according to claim 1, wherein the neural network comprises:
   at least one combination layer, at least one residual module, at least one pooling layer, and at least one fully connected layer, wherein the combination layer is formed by connecting at least one convolutional layer, at least one batch normalization layer, and at least one activation function layer, and the residual module comprises at least two successively connected combination layers.

3. The method according to claim 1, wherein the preset learning rate function comprises: a nonlinear function with a function value varying with a number of iterations.

4. The method according to claim 3, wherein the preset learning rate function is:

$$lr\_t = lr\_min + \frac{1}{2}(lr\_max - lr\_min)\left(1 - \cos\left(2\pi \times \frac{T\_cur}{T\_tot}\right)\right),$$

wherein lr_t represents a value of the learning rate in a t-th iterative training, lr_min represents a minimum value of the learning rate, lr_max represents a maximum value of the learning rate, T_cur represents a cumulative number of iterations prior to the t-th iterative training, and T_tot represents a preset total number of iterations.

5. The method according to claim 1, wherein the preset momentum function comprises: a nonlinear function with a function value varying with a number of iterations.

6. The method according to claim 1, wherein the method further comprises:
   acquiring the training data set corresponding to the deep learning task, and performing data augmentation processing on the training data set.

7. The method according to claim 6, wherein the performing data augmentation processing on the training data set comprises:
   performing data cutout and/or data mixup on the task data in the training data set to generate new task data, and adding the new task data to the training data set.

8. The method according to claim 1, wherein the method further comprises:
   processing to-be-processed data of the deep learning task using the neural network obtained by a plurality of iterations of iterative training, and outputting a processing result of the to-be-processed data.

9. An electronic device, comprising:
   one or more processors; and
   a storage unit configured to store one or more programs,
   the one or more programs, when executed by the one or more processors, causing the one or more processors to:
   acquire a neural network corresponding to a deep learning task; and
   perform a plurality of iterations of iterative training on the neural network based on a training data set, wherein the training data set comprises task data corresponding to the deep learning task, and
   the iterative training comprises:
   processing the task data in the training data set using a current neural network, and determining, based on a processing result of the neural network on the task data in a current iterative training, prediction loss of the current iterative training;
   determining, based on a preset learning rate function, a preset momentum function, and a current number of iterations, a learning rate and a momentum in the current iterative training; and
   updating weight parameters of the current neural network by gradient descent based on a preset weight decay, and the learning rate, the momentum, and the prediction loss in the current iterative training.

10. A non-transitory computer readable medium, storing a computer program thereon, wherein the computer program, when executed by one or more processors, causes the one or more processors to:
    acquire a neural network corresponding to a deep learning task; and
    perform a plurality of iterations of iterative training on the neural network based on a training data set, wherein the training data set comprises task data corresponding to the deep learning task, and
    the iterative training comprises:
    processing the task data in the training data set using a current neural network, and determining, based on a processing result of the neural network on the task data in a current iterative training, prediction loss of the current iterative training;

determining, based on a preset learning rate function, a preset momentum function, and a current number of iterations, a learning rate and a momentum in the current iterative training; and updating weight parameters of the current neural network by gradient descent based on a preset weight decay, and the learning rate, the momentum, and the prediction loss in the current iterative training.

\* \* \* \* \*